United States Patent
Snodgrass et al.

(10) Patent No.: US 6,286,875 B1
(45) Date of Patent: Sep. 11, 2001

(54) ELECTRICALLY INSULATED INTEGRAL UNION PIPE GAS LINE SYSTEM

(75) Inventors: Larry R. Snodgrass, Worthington; Mark D. Williams, Wooster, both of OH (US)

(73) Assignee: Schuler Manufacturing Company, Hilliard, OH (US)

( * ) Notice: Subject to any disclaimer, the term of this patent is extended or adjusted under 35 U.S.C. 154(b) by 0 days.

(21) Appl. No.: 09/538,086

(22) Filed: Mar. 29, 2000

Related U.S. Application Data
(60) Provisional application No. 60/127,077, filed on Mar. 31, 1999.

(51) Int. Cl.[7] .............................. F16L 19/02; F16L 55/00
(52) U.S. Cl. .................................. 285/52; 285/47; 285/55
(58) Field of Search .................................. 285/50, 52, 54, 285/55, 47

(56) References Cited

U.S. PATENT DOCUMENTS

| | | | | |
|---|---|---|---|---|
| 2,574,191 | * | 11/1951 | Platzer | 285/52 |
| 2,837,351 | * | 6/1958 | Bailey | 285/52 |
| 3,018,119 | * | 6/1962 | Champion | 285/52 |
| 3,115,354 | * | 12/1963 | Bowan et al. | 285/52 |
| 3,441,293 | * | 4/1969 | Bagnulo | 285/52 |
| 3,517,950 | * | 6/1970 | Anderson | 285/52 |
| 3,612,578 | * | 10/1971 | Bagnulo | 285/50 |
| 4,927,186 | * | 5/1990 | Zoboli | 285/54 |
| 5,588,682 | | 12/1996 | Breese . | |

FOREIGN PATENT DOCUMENTS

| | | | | |
|---|---|---|---|---|
| 1047939 | * | 12/1953 | (FR) | 285/52 |
| 709779 | * | 6/1966 | (IT) | 285/52 |

* cited by examiner

*Primary Examiner*—Eric K. Nicholson
(74) *Attorney, Agent, or Firm*—Ralph E. Jocke; Daniel D. Wasil; Walker & Jocke

(57) ABSTRACT

A system and method for electrically isolating conduit connections in a gas line system for residential, commercial or industrial applications. Gas line conduit of standard configuration is cut to length and upset at one end to create an annular flange of increased diameter, which then is machined to a desired configuration having annular ridges and flat and tapered surfaces. The other end of the conduit is machined in a standard thread configuration. The flanged portion of the conduit is then placed in an injection molding machine and receives a non-conductive elastomeric, molded seal thereover which includes a tubular pilot portion. A coupling nut slipped over the conduit may then join the conduit to conventional gas line valves, meters or the like in a completely electrically insulated connection.

22 Claims, 3 Drawing Sheets

ELECTRICALLY INSULATED INTEGRAL UNION PIPE GAS LINE SYSTEM

This application claims benefit of provisional No. 60/127,077 filed Mar. 31, 1999.

TECHNICAL FIELD

The present invention relates to gas line conduit systems and more particularly to an electrically insulated system which includes an integral union pipe as part of the system, which pipe is electrically insulated at one end for preventing the flow of electricity through the conduit to an earth ground. The invention further relates to the method of manufacture of such system.

DISCUSSION OF THE PRIOR ART

Gas lines of the type addressed by the teachings of this invention are well known as systems for bringing gas under pressure from underground delivery pipes into an establishment such as a residence or commercial structure, for utilization therein. For purposes of this specification "gas line" is intended to mean any conduit, pipe or similar-type enclosed passageway used to transfer gas under pressure. The gas may be used for any purpose, but most often is used for supplying heating energy, and it is common to utilize natural gas for this purpose.

The main gas line is generally buried underground, being brought in from the street or from any other source of supply. It often includes some form of metallic conduit which is capable of conducting electrical current. Once brought into the building, interior piping is utilized to plumb a system. The system might typically comprise a shutoff valve, pressure regulator, gas meter near the point of entry, and further conduits for delivering the gas to the various utilization devices.

Undesired electrical current may be generated in these supply systems from a variety of sources, such as for example, the flow of gas itself, which creates distributed electrical potentials. Electrical currents may also result from improper or defective wiring, and the like. Such current may then be transmitted through the interior conduits to the exterior underground line and create an undesirable condition. Such electrical discharges into the earth can create erosion of the supply line and its consequent failure prior to its otherwise predicted lifetime.

In the past, insulating fittings such as swivels and unions have been utilized that can be included in gas lines to provide an insulated connection between pipes that carry the combustible gas. Most often, these comprise a threaded coupling which has a union connection at one end which is covered or encapsulated in some manner with nonconductive material to interrupt the metal to metal connection and prevent the flow of electricity. While solving the electrical problem, such devices introduce another threaded joint into the system. Such a joint presents a potential leakage problem due to faulty installation, or more likely due to environmental conditions such as vibration, corrosion or damage by external forces.

Another form of insulated gas line conduit is shown in U.S. Pat. No. 5,588,682 in which a length of conduit may be provided with a threaded connection at one end and a flange at the other forming a flange for connection as a union with mating components. The flanged end of the conduit is covered with non-conductive material and serves to isolate the components to prevent conduction of electricity. In this arrangement, a pilot portion is formed at the end of the conduit to guide the conduit in its mating connection with the spud of a component to be connected. A relatively thin layer of non-conducting material thus covers the end of the conduit at the location where the prevention of conduction of electricity is desired.

Thus it may be seen that a need exists for a relatively inexpensive, reliable insulating coupling system for metal gas lines, which is not only easy to use and install, but also avoids unwanted electrical conduction and additional threaded connections.

SUMMARY OF THE INVENTION

The preferred exemplary coupling device and system of the present invention comprises an enclosed metal passageway suitable for transporting a pressurized gas. The passageway carries the gas to or from a gas meter. The system preferably comprises a conduit having a desired preformed configuration and having at one end portion a flange. An insulating resilient seal layer which is preferably a molded nylon piece, covers the flange end portion of the conduit, thereby electrically insulating the flange end portion. The system further has a threaded ring nut which can be moved over the conduit to engage the flange and further engage a component such as a shut off valve, which has a mating, flange-receiving, connector thereon.

In use, a threaded nipple, spud or other mating connector of a device having an outer thread is aligned with and pressed against the insulating resilient seal carried on the flanged end of the coupling. A ring nut is then moved over the conduit toward the spud until the open, threaded portion of the ring nut which extends beyond the flange, can be turned to engage the internal threads of the ring nut with the threads of the spud. As the nut is screwed onto the spud, the nut compresses the seal, and holds the flange and spud together, thereby tightly connecting and sealing the conduit to the spud. Thus the seal may act as both an insulator and a seal.

In the preferred embodiment of the invention, the gas carrying conduit which is to be insulated is a pipe nipple having a thread at one end and an enlarged flange at the other. The flange is machined into a preferred configuration and then encapsulated in an injection molding machine to provide an electrical non-conductive seal thereover. The seal is also of a predetermined configuration and includes not only a sealing portion of substantial thickness, but also an integral pilot portion. The pilot is a tubular extension of the seal beyond the flange on the nipple, and serves to center and guide the nipple and flange toward the sealing surface of the spud, by entering the bore of the spud upon makeup of the connection.

A ring nut which is placed over the nipple and slid along the length thereof into engagement with the flange, serves to complete the connection. Interior threads in the nut engage exterior threads of the spud and upon tightening, draw the pilot into the bore, and the flange toward the spud until a sealing engagement is effected. The arrangement of the flange and seal thereby provides surfaces which are engaged by the nut and which contact the spud to provide a non-metallic connection and thus insulation against the flow of electricity.

Preferably the flange at the end of the nipple is cold formed into an enlarged flange which is then suited for formation of specific surfaces for retention of the seal, for mechanical retention of the nipple with a mating component, and for the formation of a transverse annular sealing surface, which then serves as a union connection in the makeup of an entire conduit system. After cold forming, the flange is machined to a configuration comprising an inner annular ridge and an outer annular ridge, the two being joined by a central cylindrical section and a tapered or conical section. The central cylindrical section further includes a small intermediate ridge located near the inner ridge.

The outer ridge is machined to a diameter to substantially match the mating surface of a component to be joined, and has a flat, transverse face surrounding the bore of the nipple. Extending inwardly from the outer ridge is the conical section, joining the central cylindrical section at a diameter less than the diameter of the outer ridge. The central section extends inwardly to the inner ridge, the latter having a diameter greater than the central section and less than the outer ridge, and which serves as a limit for the seal material which will encapsulate the remainder of the outer flange. The intermediate ridge serves to enhance the grip of the seal.

The seal is comprised preferably of an elastomeric material such as nylon, and is joined to the nipple preferably in an injection molding operation. As such the nipple is placed in the molding machine and material extruded over the flange section to completely cover the end of the nipple, externally from the inner flange outwardly over the outer ridge and internally inwardly of the inner ridge. The thickness of the seal is preferably such as to substantially conform to the diameter of the inner ridge and completely cover the conical section and the outer ridge including the transverse sealing face thereof and to form a substantially continuous inner bore for the flange. The seal further includes a tubular portion extending outwardly of the transverse face and integral therewith, forming a pilot to assist in the makeup of the connection. The pilot extends from the inner bore of the nipple axially outward only a short distance to provide a small axial projection and extends radially outward a similar short distance alongside the transverse face of the outer ridge of the flange.

DETAILED DESCRIPTION OF THE PREFERRED EMBODIMENT

Figure 1:
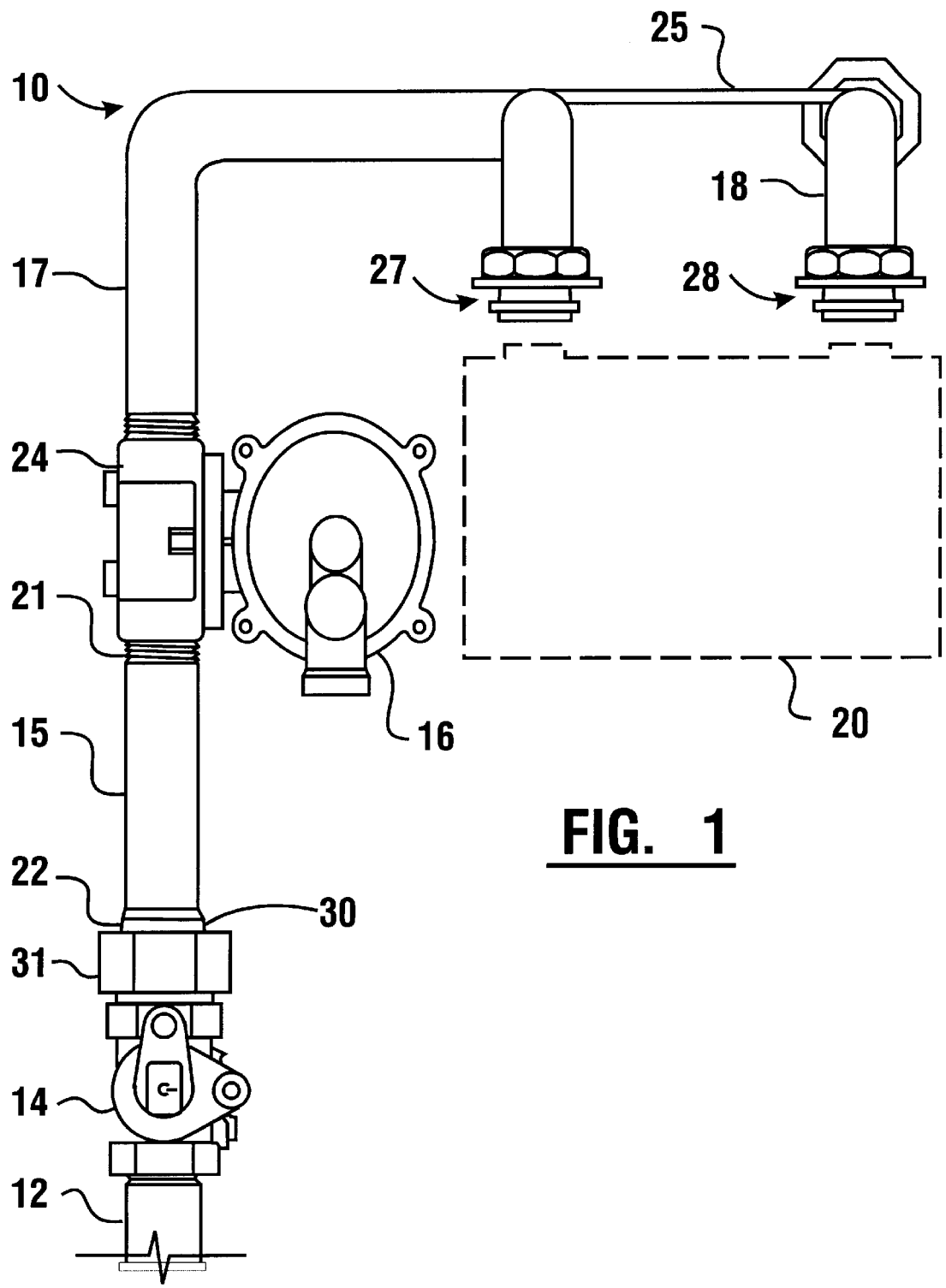
FIG. 1 is a perspective view of a system with an insulating coupling therein in combination with a supply shutoff valve and other gas line related components, in accordance with the present invention.

A preferred exemplary embodiment of the invention is shown in FIG. 1 and is generally indicated as 10. The system 10 includes an inlet conduit 12, a supply shut-off valve 14, a nipple 15, a regulator 16, preformed conduits 17, 18 and a gas meter 20. Nipple 15 and conduits 17, 18 are derived from standard metallic gas pipe and can be of any configuration, being bent as needed to suit the particular installation. In this exemplary embodiment nipple 15 is a straight length of conduit having threads 21 at one end and flange 22 at the other end.

The conduits are preferably derived from standard API-5L gas pipe which is a standard ¾ inch, 1 inch, 1¼ inch pipe or the like. In this description all dimensions will be referenced to standard 1 inch size pipe.

Regulator 16 includes an adapter coupling 24 thereon which directs gas flow therethrough and which may be threaded to nipple 15 and conduit 17 by standard threaded connections. Conduit 18 is joined to conduit 17 by weldment 25 to provide a rigid predetermined spacing therefrom, each of the conduits terminating in respective flanged couplings 27, 28 which are spaced to mate with conventional gas meter 20 and to be joined by the respective coupling nuts in a manner well understood in the art. Conduit 18 is described as a 90 degree bend conduit and delivers gas which has been routed through gas meter 20, to the remainder of the gas system of the installation which might be a home residence or commercial establishment and may be of considerable length and with multiple branches of distribution.

All of the components described so far are essentially metallic components and as such are capable of conducting electrical current derived anywhere within the system to inlet conduit 12, which typically is buried underground and susceptible to corrosion activity, concentrated by electrical discharge into the earth. Nipple 15 of the invention prevents such flow of electricity by the inclusion of a seal 30 at flange 22 which entirely prevents metal to metal contact, thereby interrupting the electrical circuit. Nipple 15 is secured to shut off valve 14 by a nut 31, such as a metallic valve nut or ring nut, in a union type connection, but is completely isolated from valve 14 and nut 31 by a seal 30 as will be described in greater detail hereinafter.

Figure 7:
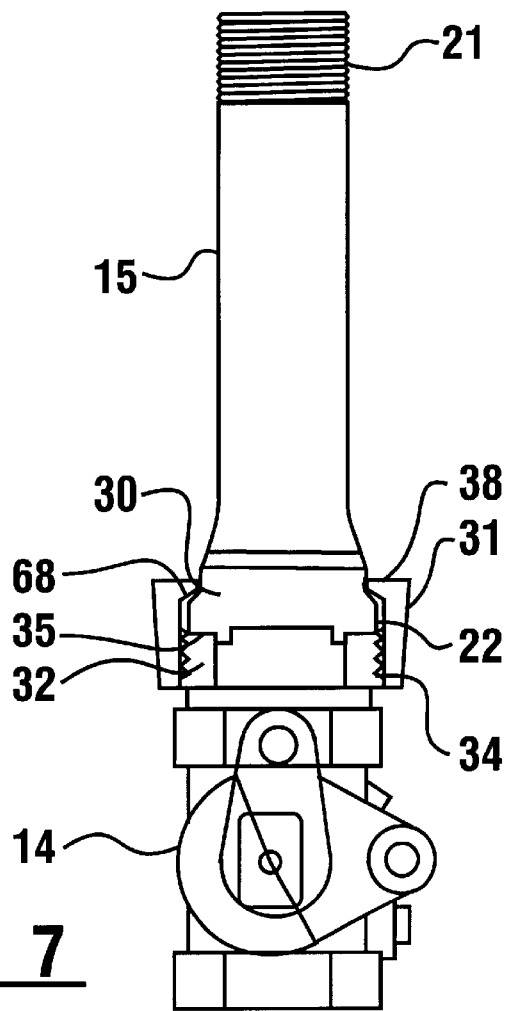
FIG. 7 is a partially sectioned perspective view of a part of the system of FIG. 1 showing the nipple and shutoff valve portion.

Referring to FIG. 7 there is shown a portion of the system 10 of FIG. 1 in which nipple 15 is connected with shut-off valve 14 with valve nut 31 securing the flange 22 of nipple 15 through the intermediary of seal 30. Valve 14 includes a boss or spud 32 at one end thereof having exterior threads 34 thereon and a transverse annular sealing face 35 adapted for sealing engagement with the transverse seal face of flange 22, to be described in greater detail. Valve nut 31 includes mating interior threads and a retaining shoulder 38 inwardly of flange 22, to draw nipple 15 into secure engagement with valve 14. It will be apparent that due to the presence of seal 30 no metal to metal connection is established between nipple 15 and valve 14, thereby preventing the flow of electricity between the components.

A method of manufacture of nipple 15 and specific characteristics thereof are described in more detail in FIGS. 2–6. It will be clear however, that nipple 15 is but one form of component that could be utilized according to the teachings of this invention to provide a location for seal 30, and that similar seals could be established at other conduit connections or in connection with various other components of the system other than at shut-off valve 14.

Figure 2:
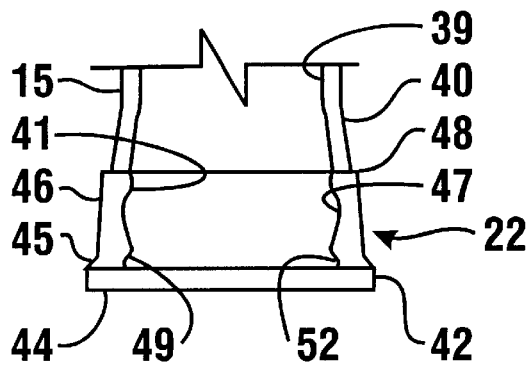
FIG. 2 is a sectional view of the flange end of a conduit during the forming process, after the end has been cold-formed to shape.

In FIG. 2 a first stage of manufacture of nipple 15 is depicted at which a length of standard conduit such as API-5L gas pipe is cut off and cold formed at one end to form flange 22 of radially increased diameter. Flange 22 is of generally cylindrical configuration and is preceded by a lead-in taper section 40 from the main body of nipple 15. Flange 22 includes an outer annular ridge 42 having a seal supporting end face or transverse annular face 44 at the longitudinal outer end thereof surrounding the bore 39 of nipple 15. A conical surface 45 tapers inwardly from outer ridge 42 to cylindrical upset section 46, in turn being joined to taper section 40 at step 48. The interior bore 41 of flange 22 is enlarged from bore 39 and is formed in a continuous contoured configuration to have an enlarged curved section 47, a reduced curved section 49 and an enlarged spike section 52, the latter adjacent the outward end of flange 22.

Figure 3:
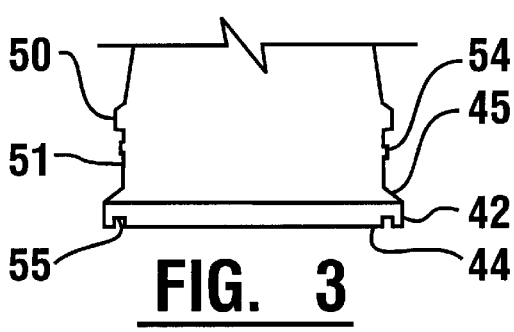
FIG. 3 is a perspective view of the flange end of a conduit during the forming process, after the end has been machined to a predetermined configuration.
Figure 6:
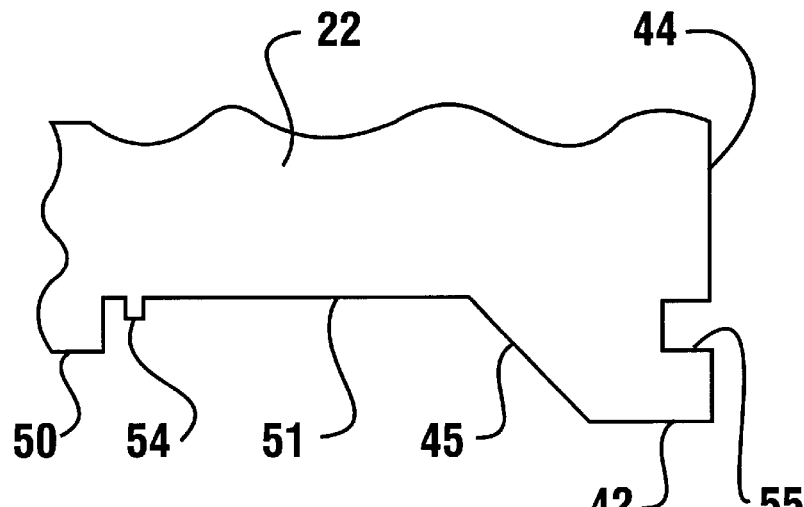
FIG. 6 is an enlarged partial sectional view of the nipple of FIG. 3.

After cold forming, flange 22 is further refined by machining to provide the preferred embodiment of flange 22 depicted in FIG. 3. Here, upset section 46 is reconfigured to provide an inner annular ridge 50, and an adjoining central cylindrical section 51, the latter joining now-enlarged conical surface 45, which in turn terminates in outer annular ridge 42. Preferably, central cylindrical section 51 is machined to include an intermediate annular ridge 54 between ridges 42, 50 and is positioned closely adjacent to ridge 50. Intermediate ridge 54 is of lesser radial dimension than ridge 50 and ridge 50 is of less radial dimensions than ridge 42. An enlarged partial view of the outer machined portion of flange 22 is shown in FIG. 6 to more clearly depict the relative dimensions of the various components of flange 22. The fully machined flange 22 is shown as well in FIG. 4 in a cross-sectional configuration.

As indicated, typical dimensions are related to a one inch size of standard pipe and as such result in an outer ridge 42 diameter of about 1.73 inch, a 45 degree angle to conical surface 45, an inner ridge 50 diameter of about 1.57 inch and a further reduced central cylindrical section 51 diameter of about 1.50 inch. Central section 51 extends axially about 0.50 inch while inner and outer ridges 50, 42 extend about 0.125 inch. Intermediate ridge 54 extends about 0.020 inch radially from central section 51, is about 0.020 inch in axial extent and spaced about 0.020 inch from inner ridge 50.

An annular face groove 55 is provided in transverse face 44 of outer ridge 42 to enhance retention of seal 30. Face groove 55 is on the order of 0.05 inch in radial width and axial depth, is concentric with nipple bore 39 and spaced about 0.09 inch radially inward of the outer surface of outer ridge 42.

Upon completion of the machining, operation nipple 15 is placed in an injection molding machine for forming seal 30 in integral engagement with flange 22 thereof. Nipple 15 with seal 30 thereon is shown in a sectional view in FIG. 4 and in a perspective view in FIG. 5. A view of the assembled nipple 15 and shut-off valve 14 is provided in FIG. 7, as previously described.

Figure 4:
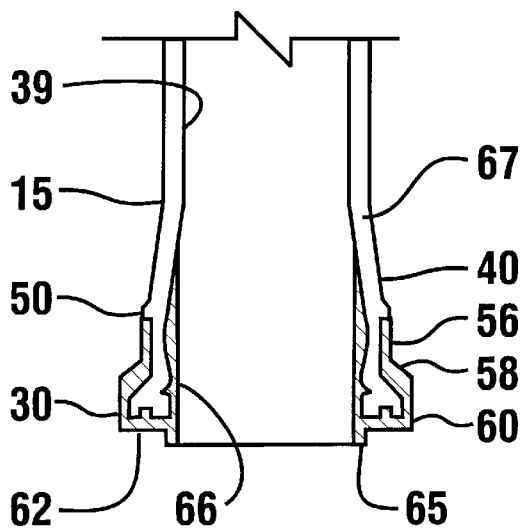
FIG. 4 is a sectional view of the flange end of a conduit after the end has been encapsulated with an elastomeric seal in an injection molding process.
Figure 5:
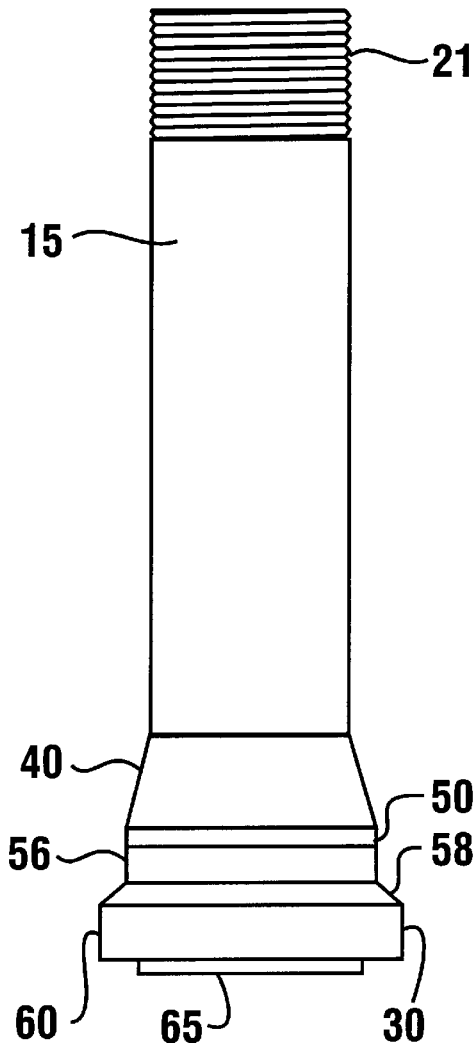
FIG. 5 is a perspective view of the entire nipple of the invention with the elastomeric seal molded in place.

As best seen in FIG. 4, seal 30 preferably entirely encloses or encapsulates flange 22 from inner ridge 50 on the exterior of flange 22, over transverse face 44 and over the interior periphery of flange bore 41 to a location closely adjacent nipple bore 39, axially inwardly of inner ridge 50. Thus intermediate ridge 54 and cylindrical section 51 are covered by a cylindrical support section 56 of seal 30, extending axially outwardly to conical retainer section 58 which generally overlies conical surface 45 of nipple 15. Conical retainer section 58 extends radially and axially outwardly to join outer cylindrical seal flange 60 which generally overlies outer ridge 42 and extends axially beyond transverse face 44 to provide an end face abutting portion or transverse seal face 62. Seal face 62 is annular and parallels transverse face 44 and terminates at its inner diameter in integral molded pilot 65 which is a tubular axial extension of seal 30 outwardly of seal face 62. The inner portion of seal 30 is one integral generally tubular section 66 having an inner cylindrical periphery terminating at the end in pilot 65 and extending inwardly toward the inner bore 39 of nipple 15, terminating at a junction 67 with the inner wall of taper section 40. The outer periphery of tubular seal section 66 conforms with the inner surface of flange 22 and thus fills curved sections 47, 49 (see FIG. 2) as well as spike section 52. Seal 30 also fills face groove 55 to provide additional stability against relative shifting movement between seal 30 and its support structure, flange 22.

The diameter of support section 56 is approximately the same as that of inner ridge 50 on the order of 1.57 inch, while the outside diameter of outer flange 60 is about 1.85 inch. Outer seal flange 60 extends axially approximately 0.33 inch and pilot 65 extends axially about 0.09 inch from seal face 62. Pilot 65 has an internal diameter of about 1.10 inch and an external diameter of about 1.24 inch, while the internal diameter (i.e., bore 39) of nipple 15 is about 1.05 inch.

In makeup of the connection between nipple 15 and valve 14, as shown in FIG. 7, valve nut 31 is slid over the threaded end of the nipple 15 and brought into engagement with seal 30 on flange 22. Valve nut 31 includes standard internal threads and a rearward shoulder 38, being joined by internal conical section 68 having a bevel of 45° which engages the conical retainer section 58 of seal 30 (see FIGS. 4 and 5). Nipple 15 is thus drawn into tight engagement with spud 32 with seal face 62 in sealing engagement with the transverse face of spud 32. In this arrangement, metal to metal contact between valve 14 and nipple 15 is precluded by the interposition of portions of seal 30 to provide electrical isolation in the system. Thus the seal 30 may act as both an insulator and a seal.

Thus the electrically insulated conduit and method of the present invention achieves the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the structures shown herein or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations and relationships are set forth in the appended claims.

What is claimed is:

1. An electrically insulated conduit adapted to carry combustible gas, comprising a metal conduit having a radially enlarged integral flange at one end thereof, the flange having a seal supporting end face at the longitudinal outer end thereof, wherein the end face is adapted to be positioned adjacent a mating surface of a spud of a component to be joined to the flange in sealing engagement, the flange having an inner bore, wherein the bore has an axis, an elastomeric integral seal in engagement with the flange,
- the seal having an end face abutting portion, wherein the end face abutting portion abuts the end face of the flange,
  - the end face abutting portion having an outermost face,
- the seal extending inside the flange bore,
- the seal further including a tubular pilot,
- the pilot having an outer peripheral surface, wherein the outer peripheral surface is radially inward of the end face,
- the pilot outer peripheral surface extending axially outward of the outermost face.

2. The conduit according to claim 1 wherein the seal is in molded engagement with the flange.

3. The conduit according to claim 1 wherein the flange end face comprises a longitudinal outer end of the metal conduit.

4. The conduit according to claim 3 wherein the seal comprises electrically non-conductive material.

5. The conduit according to claim 1 wherein the flange includes
- an outer annular ridge,
- an inner annular ridge,
- a reduced neck portion,
- the neck portion located axially inwardly of the outer ridge and terminating at the inner ridge, the neck portion having a central cylindrical section of lesser diameter than the inner ridge and the outer ridge,
- wherein the seal extends between the inner ridge and the outer ridge.

6. The conduit according to claim 5 wherein the flange has an inner surface extending axially inwardly of the inner ridge, wherein the seal continually encloses the flange from the inner ridge to an inner surface position axially inwardly of the inner ridge.

7. The conduit according to claim 6 wherein the seal is in integral engagement with the flange.

8. The conduit according to claim 7 wherein the seal comprises electrically non-conductive material.

9. The conduit according to claim 8 wherein the seal is in molded engagement with the flange.

10. The conduit according to claim 9 wherein the molded engagement is from placing the flange in an injection molding machine.

11. A method of electrically insulating a conduit adapted to carry combustible gas, comprising the steps of
- constructing a radially enlarged integral flange at one end of a metal conduit, the flange having an inner bore, wherein the bore has an axis, the flange including a seal supporting end face at the longitudinal outer end of the flange, the end face adapted to be positioned adjacent a mating surface of a spud of a component for joining to the flange in sealing engagement,
- providing an elastomeric integral seal, the seal including a bore abutting portion, the seal including an end face abutting portion having an outermost face, the seal further including a tubular pilot having an outer peripheral surface,
- engaging the seal with the flange, the engaging step further including
  - placing the bore abutting portion in abutting relationship with the bore,
  - placing the end face abutting portion in abutting relationship with the end face,
  - placing the pilot outer peripheral surface radially inward of the end face such that the pilot outer peripheral surface extends axially outward of the outermost face.

12. The method according to claim 11 wherein the engaging step further comprises applying the seal in molded engagement with the flange.

13. The method according to claim 11 wherein the constructing step further comprises having the flange end face comprise a longitudinal outer end of the metal conduit.

14. The method according to claim 13 wherein the providing step further comprises making the seal with electrically non-conductive material.

15. The method according to claim 11
- wherein the constructing step further comprises forming the flange with an outer annular ridge, an inner annular ridge, and a reduced neck portion located axially inwardly of the outer ridge and terminating at the inner ridge and including a central cylindrical section of lesser diameter than the inner ridge and the outer ridge,
- wherein the engaging step further comprises extending the seal between the inner ridge and the outer ridge.

16. The method according to claim 15
- wherein the constructing step further comprises forming the flange with an inner surface extending axially inwardly of the inner ridge,
- wherein the engaging step further comprises continually enclosing the flange with the seal from the inner ridge to an inner surface position axially inwardly of the inner ridge.

17. The method according to claim 16 wherein the providing step further comprises providing the seal in integral engagement with the flange.

18. The method according to claim 17 wherein the providing step further comprises providing a seal comprising electrically non-conductive material.

19. The method according to claim 18 wherein the engaging step further comprises applying the seal in molded engagement with the flange.

20. The method according to claim 19 wherein the applying step comprises placing the flange in an injection molding machine.

21. The conduit according to claim 3 wherein the flange end face extends in a substantially radial direction.

22. The method according to claim 13 wherein the constructing step further comprises having the flange end face extend in a substantially radial direction.

* * * * *